United States Patent
Chiang et al.

(10) Patent No.: US 8,146,087 B2
(45) Date of Patent: Mar. 27, 2012

(54) SYSTEM AND METHOD FOR ENABLING MICRO-PARTITIONING IN A MULTI-THREADED PROCESSOR

(75) Inventors: Men-Chow Chiang, Austin, TX (US); Sujatha Kashyap, Austin, TX (US); Mysore Sathyanarayana Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1113 days.

(21) Appl. No.: 11/972,361

(22) Filed: Jan. 10, 2008

(65) Prior Publication Data

US 2009/0183169 A1    Jul. 16, 2009

(51) Int. Cl.
    *G06F 9/46* (2006.01)
(52) U.S. Cl. ........................ 718/102; 718/104
(58) Field of Classification Search .................. None
    See application file for complete search history.

(56) References Cited

U.S. PATENT DOCUMENTS

| | | | | |
|---|---|---|---|---|
| 6,021,481 | A | 2/2000 | Eickemeyer et al. | 711/207 |
| 6,044,447 | A | 3/2000 | Averill et al. | 711/207 |
| 6,742,104 | B2 * | 5/2004 | Chauvel et al. | 711/207 |
| 7,085,890 | B2 | 8/2006 | Kashyap | 711/130 |
| 2002/0069328 | A1 * | 6/2002 | Chauvel | 711/130 |
| 2004/0025161 | A1 * | 2/2004 | Chauvel et al. | 718/102 |
| 2005/0027960 | A1 * | 2/2005 | DeMent et al. | 711/207 |
| 2005/0132364 | A1 * | 6/2005 | Tewari et al. | 718/1 |
| 2006/0206891 | A1 | 9/2006 | Armstrong et al. | 718/1 |
| 2007/0143759 | A1 * | 6/2007 | Ozgur et al. | 718/102 |
| 2008/0162868 | A1 * | 7/2008 | Glew | 711/203 |
| 2008/0235487 | A1 * | 9/2008 | Illikkal et al. | 711/207 |

* cited by examiner

*Primary Examiner* — Jennifer To
*Assistant Examiner* — Louis Diep
(74) *Attorney, Agent, or Firm* — VanLeeuwen & VanLeeuwen; David A. Mims, Jr.

(57) ABSTRACT

A system and method for allowing jobs originating from different partitions to simultaneously utilize different hardware threads on a processor by concatenating partition identifiers with virtual page identifiers within a processor's translation lookaside buffer is presented. The device includes a translation lookaside buffer that translates concatenated virtual addresses to system-wide real addresses. The device generates concatenated virtual addresses using a partition identifier, which corresponds to a job's originating partition, and a virtual page identifier, which corresponds to the executing instruction, such as an instruction address or data address. In turn, each concatenated virtual address is different, which translates in the translation lookaside buffer to a unique system-wide real address. As such, jobs originating from different partitions are able to simultaneously execute on the device and, therefore, fully utilize each of the device's hardware threads.

11 Claims, 7 Drawing Sheets

US 8,146,087 B2

SYSTEM AND METHOD FOR ENABLING MICRO-PARTITIONING IN A MULTI-THREADED PROCESSOR

BACKGROUND OF THE INVENTION

1. Technical Field

The present invention relates to a system and method for enabling micro-partitioning in a multi-threaded processor. More particularly, the present invention relates to a system and method for permitting different partitions to simultaneously utilize a processor's different hardware threads by concatenating partition identifiers with virtual page identifiers within the processor's translation lookaside buffer.

2. Description of the Related Art

Today's processors include multiple hardware threads for simultaneously executing tasks. In addition, processors dynamically reconfigure their resources into "partitions" using a shared resource pool. These partitions invoke jobs (processes) that, in turn, execute on one of the hardware threads.

A challenge found, however, is that today's processors do not allow different partitions to simultaneously utilize different hardware threads. At any given time, only jobs originating from one partition may execute on multiple threads. For example, partition A may invoke jobs 1, 2, and 3 that may simultaneously execute on hardware threads X, Y, and Z. However, jobs originating from different partitions (e.g., partition A, partition B, partition C) are not able to simultaneously execute on different hardware threads due to existing address translation limitations. As such, a processor's multi-threaded capability is wasted when a particular partition does not utilize all of a processor's hardware threads.

What is needed, therefore, is a system and method for enabling jobs originating from different partitions to simultaneously execute on a multiple hardware thread processor.

SUMMARY

It has been discovered that the aforementioned challenges are resolved using a system and method for allowing jobs originating from different partitions to simultaneously utilize different hardware threads on a processor by concatenating partition identifiers with virtual page identifiers, which results in a concatenated virtual address that the processor translates to a system-wide real address using a translation lookaside buffer.

A device includes multiple hardware threads and multiple partitions. Each partition comprises a subset of the device's resources that are part of a shared resource pool, which the device virtualizes and utilizes as separate entities. Each partition invokes jobs, or processes, which the device queues in a job queue for execution by one of the hardware threads.

In order to effectively process address translation requests from jobs that originate from different partitions, the device includes a translation lookaside buffer that translates concatenated virtual addresses to system-wide real addresses. The device generates concatenated virtual addresses using a partition identifier, which corresponds to a job's originating partition, and a virtual page identifier, which corresponds to the executing instruction, such as an instruction address or data address. In turn, each concatenated virtual address is different, which translates in the translation lookaside buffer to a different system-wide real address. As such, jobs originating from different partitions are able to simultaneously execute on the device and, therefore, fully utilize each of the device's hardware threads.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
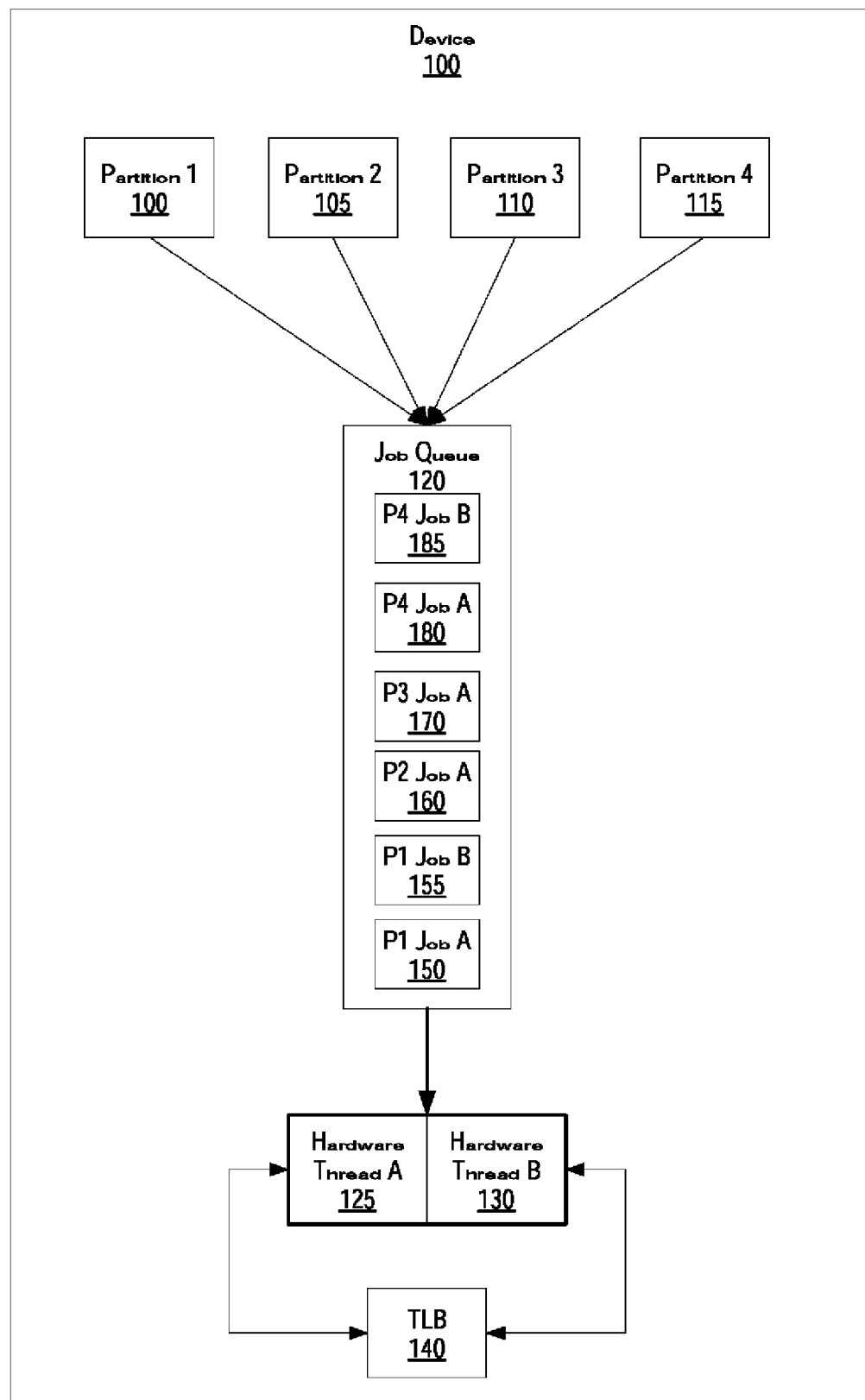
FIG. 1 is a diagram showing a device simultaneously processing jobs that originate from two different partitions.

FIG. 1 is a diagram showing a device simultaneously processing jobs that originate from two different partitions using multiple hardware threads. Device 100 includes partitions 1 100 through 4 115. Each partition comprises a subset of device 100's resources, which are part of a shared resource pool, that device 100 virtualizes and uses as separate entities. Each partition invokes jobs, or processes, which are queued in job queue 120 for execution by hardware thread A 125 or hardware thread B 130.

Both hardware thread A 125 and hardware thread B 130 share translation lookaside buffer (TLB) 140. TLB 140 includes a table with concatenated virtual addresses and corresponding system-wide real addresses. The concatenated virtual addresses are generated by concatenating a job's partition identifier and a virtual page identifier. In turn, each concatenated virtual address is different, which translates to a different system-wide real address. As such, jobs originating from different partitions are able to simultaneously execute on device 100 using hardware thread A 125 and hardware thread B 130 (see FIG. 3 and corresponding text for further details).

FIG. 1 shows that job queue 120 includes two jobs from partition 1 (P1 Job A 150 and P1 155), one job from partition 2 105 (P2 Job A 160), one job from partition 3 110 (P2 Job A 170), and two jobs from partition 4 115 (P4 Job A 180 and P4 Job B 185). As the jobs work their way down job queue 120, device 100 loads each job in either hardware thread A 125 or hardware thread B 130, whichever thread is available. Since TLB 140 includes concatenated virtual addresses, hardware threads A 125 and B 130 are able to use TLB 140 to effectively translate virtual page identifiers to system-wide real addresses by using a currently executing job's corresponding partition identifier (see FIGS. 2A-2C, 3, and corresponding text for further details). In one embodiment, the invention described herein operates in a multi-processor environment. In this embodiment, a single processor processes job requests originating from different partitions using its translation lookaside buffer and hardware threads even though the different partitions may reside on different processors.

Figure 2:
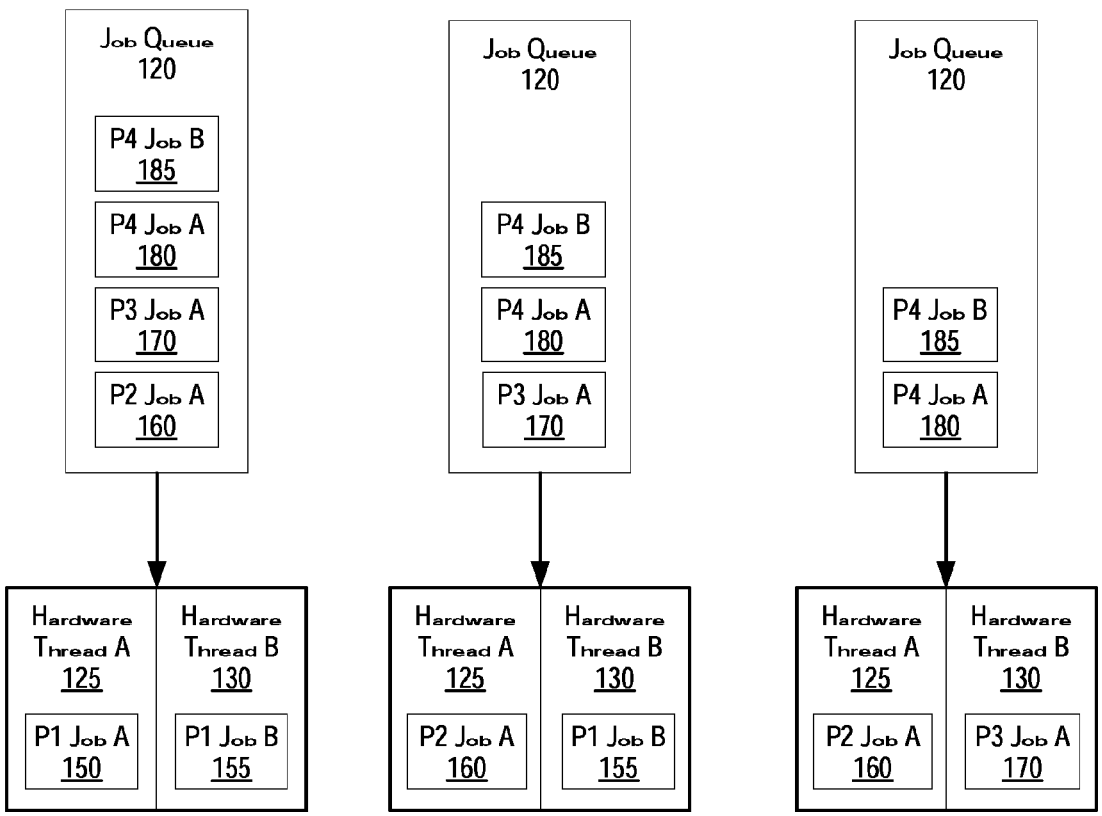
FIG. 2A is a diagram showing two hardware threads executing different jobs originating from the same partition.
FIG. 2B is a diagram showing two jobs, which originate from different partitions, simultaneously executing on two different hardware threads that reside on a single device.
FIG. 2C is a diagram showing two jobs, which originate from different partitions, simultaneously executing on two different hardware threads that reside on a single device.

FIG. 2A is a diagram showing two hardware threads executing different jobs that originate from the same partition. Referring back to FIG. 1, P1 job A 150 and P1 job B 155 were the first two jobs in job queue 120 ready for execution. FIG. 2A shows that P1 job A 150 loads into hardware thread A 125 and P1 job B 155 loads into hardware thread B 130. In turn, the remaining jobs included in job queue 120 move closer to the front of job queue 120. When either P1 Job A 150 or P1 Job B 155 finishes, the next job in the queue (P2 Job A 160) loads into the available hardware thread and commences execution, regardless of whether the other hardware thread is still executing a job from the first partition (see FIG. 2B and corresponding text for further details).

FIG. 2B is a diagram showing two jobs, which originate from different partitions, simultaneously executing on two different hardware threads that reside on a single device. Referring back to FIG. 2A, FIG. 2B shows that P1 job A 150 completes and P2 job A 160 loads onto hardware thread A 125 for execution. At this point, hardware thread A 125 and hardware thread B 130 contain jobs that originate from different partitions. Although the jobs originate from different partitions, the invention described herein allows simultaneous execution due to the fact that the translation lookaside buffer (TLB) that hardware thread A 125 and hardware thread B 130 both access contains concatenated virtual addresses that include a partition identifier that identifies a particular partition. As a result, when a job originating from a partition requests a real address from the TLB, the TLB is able to provide a correct system-wide real address (see FIG. 3 and corresponding text for further details).

FIG. 2C is a diagram showing two jobs, which originate from different partitions, simultaneously executing on two different hardware threads that reside on a single device. Referring back to FIG. 2B, FIG. 2C shows that P1 job B 155 completes and P3 job A 170 loads into hardware thread B 130. Again, the invention described here allows hardware thread A 125 to execute P2 job A 160 at the same time that hardware thread B 130 executes P3 job A 170 even though they originate from different partitions.

Figure 3:
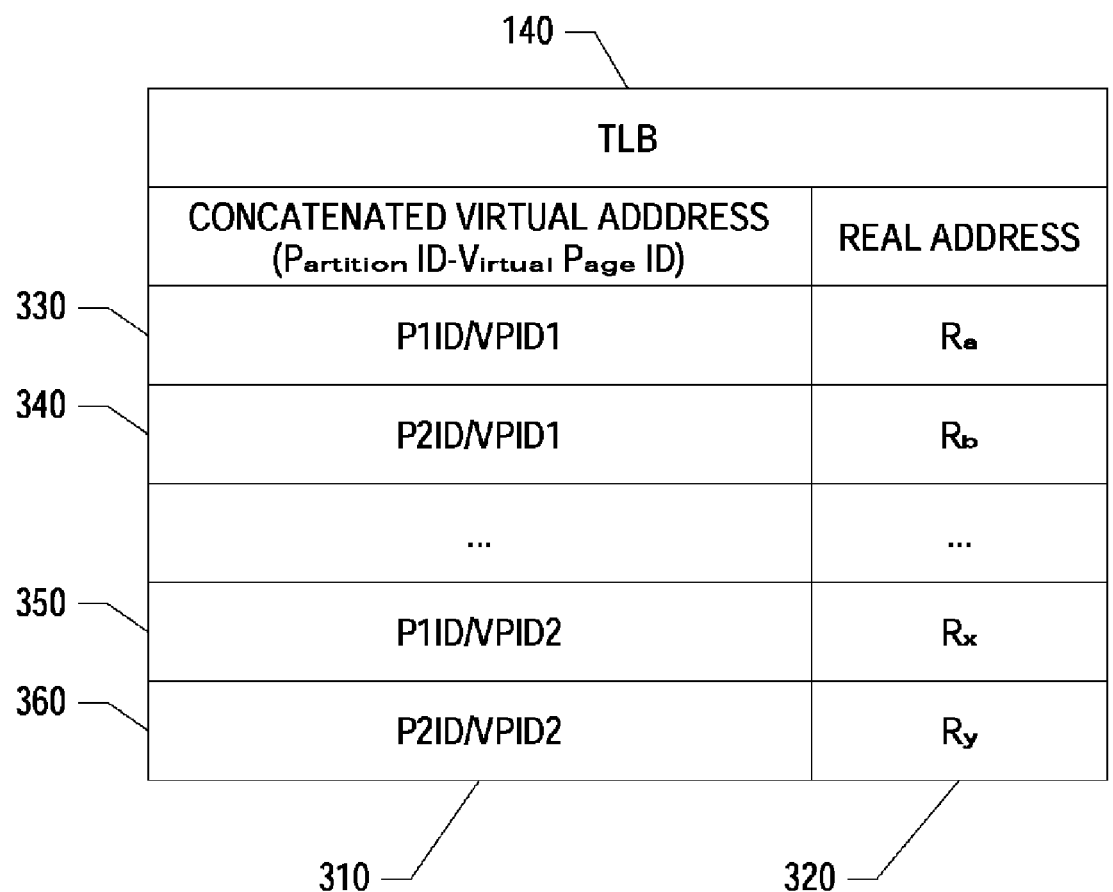
FIG. 3 is a diagram showing a translation lookaside buffer that includes concatenated virtual addresses and corresponding system-wide real addresses.

FIG. 3 is a diagram showing a translation lookaside buffer that includes concatenated virtual addresses and corresponding system-wide real addresses. TLB 140, which is the same as that shown in FIG. 1, includes columns 310 and 320. Column 310 includes concatenated virtual addresses, which are addresses that are generated using a partition identifier and a virtual page identifier. As such, the invention described herein allows jobs originating from multiple partitions to utilize TLB 140 due to the fact that each entry within column 310 is different even though many of the entries may be based upon the same virtual page identifier. For example, row 330 and 340 include the same virtual page identifier (VPID1), but row 330 corresponds to a first partition (partition 1 identifier) and row 340 corresponds to a second partition (partition 2 identifier). In turn, when the first partition sends a request to access memory using virtual page identifier "V1," processing concatenates partition 1 identifier with virtual page identifier V1 and retrieves real address "Ra" from row 330. Likewise, when the second partition sends a request to access memory using virtual page identifier "V1," processing concatenates partition 2 identifier with virtual page identifier V1 and retrieves real address "Rb" from row 340.

Rows 350 and 360 show a similar situation using virtual page identifier "V2." when the first partition sends a request to access memory using virtual page identifier "V2," processing concatenates partition 1 identifier with virtual page identifier V2 and retrieves real address "Rx" from row 350. Likewise, when the second partition sends a request to access memory using virtual page identifier "V2," processing concatenates partition 2 identifier with virtual page identifier V2 and retrieves real address "Ry" from row 360.

Figure 4:
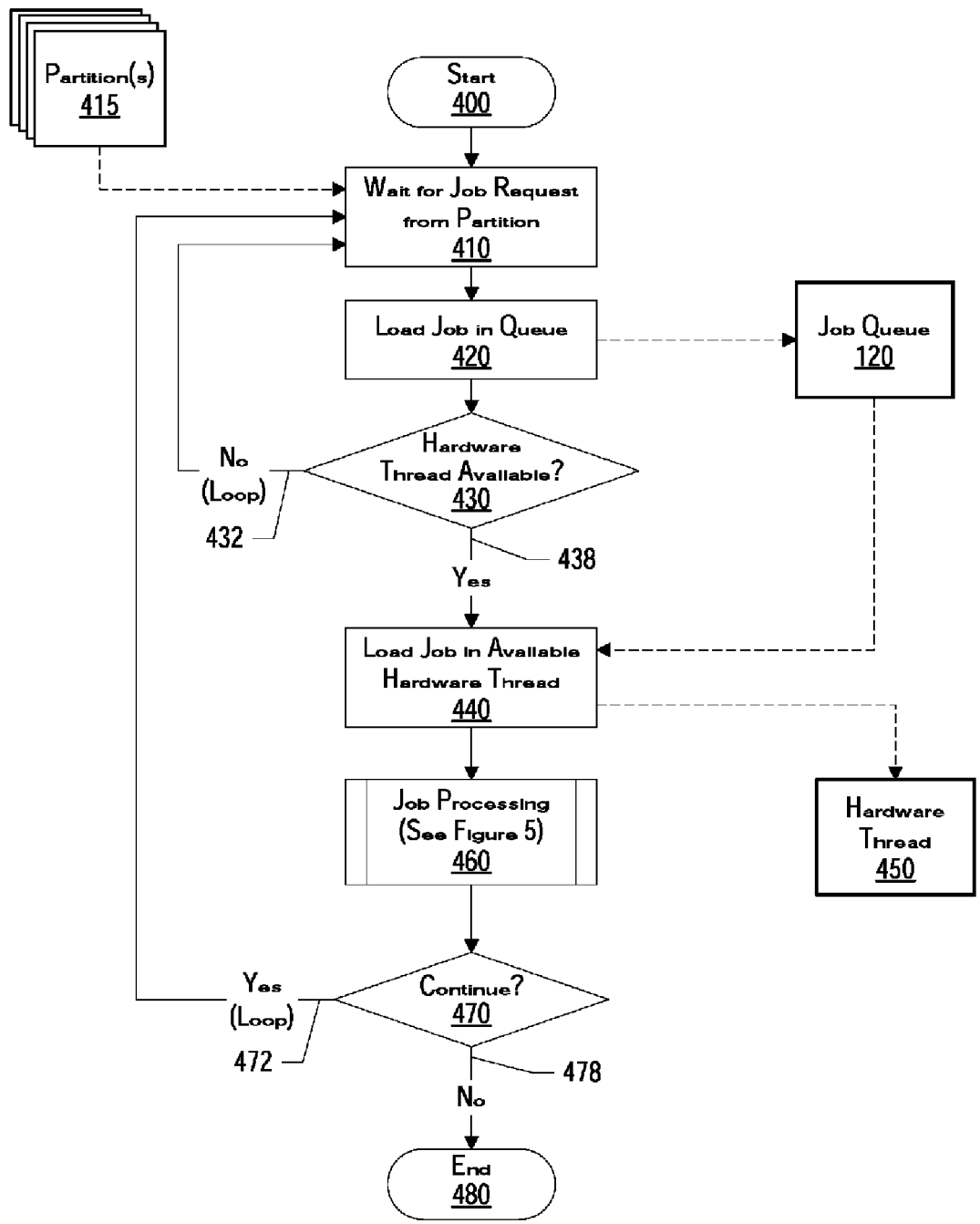
FIG. 4 is a high-level flowchart showing steps taken in simultaneously executing jobs that originate from different partitions.

FIG. 4 is a high-level flowchart showing steps taken in simultaneously executing jobs that originate from different partitions. Processing commences at 400, whereupon processing waits for a job request from one of partitions 415 at step 410, such as partitions 1 100 through 4 115 shown in FIG. 1. When processing receives a job request, processing loads the job in job queue 120 (step 420), which queues the job for execution. Job queue 120 is the same as that shown in FIG. 1.

A determination is made as to whether a hardware thread is available (decision 430). If a hardware thread is not available, decision 430 branches to "No" branch 432, which loops back to receive more job requests from partitions 415. This looping continues until a hardware thread is available, at which point decision 430 branches to "Yes" branch 438 whereupon processing loads a job that is next in line in job queue 120 into hardware thread 450, which is the available hardware thread.

Figure 5:
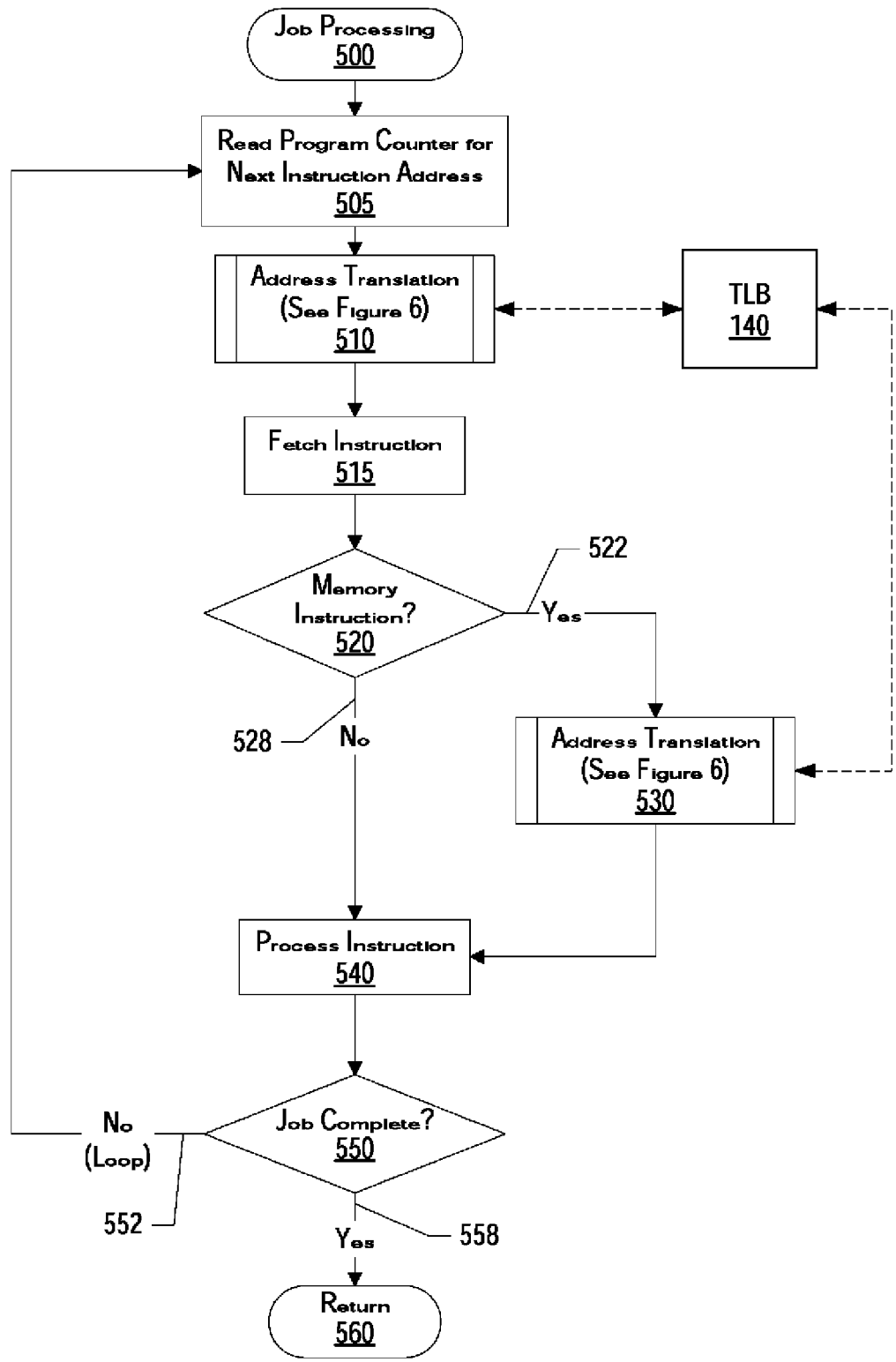
FIG. 5 is a flowchart showing steps taken in processing a job using a hardware thread.

Processing executes the job using hardware thread 450 independent of other executing jobs that originate from different partitions by using a translation lookaside buffer that translates concatenated virtual addresses to system-wide real addresses (pre-defined process block 460, see FIG. 5 and corresponding text for further details).

A determination is made as to whether to continue processing (decision 470). If processing should continue, decision 470 branches to "Yes" branch 472, which loops back to receive and process more job requests. This looping continues until processing should terminate, at which point decision 470 branches to "No" branch 478 whereupon processing ends at 480.

FIG. 5 is a flowchart showing steps taken in processing a job using a hardware thread. Job processing commences at 500, whereupon processing reads a program counter for the job's next instruction address (step 505). The next instruction address corresponds to a virtual page identifier, which processing concatenates with the job's corresponding partition identifier and translates into a system-wide real address using TLB 140 (pre-defined process block 510, see FIG. 6 and corresponding text for further details).

At step 515, processing fetches the instruction using the system-wide real address. A determination is made as to whether the fetched instruction is a memory instruction, such as a load or store instruction (decision 520). If the instruction is not a memory instruction, decision 520 branches to "No"

branch 528 whereupon processing processes the instruction at step 540. On the other hand, if the instruction is a memory instruction, decision 520 branches to "Yes" branch 522 whereupon processing translates the memory location into a system-wide real address using the job's corresponding partition identifier and the virtual page identifier that corresponds to the memory location (pre-defined process block 530, see FIG. 6 and corresponding text for further details). Processing then executes the instruction using the system-wide real address at step 540.

A determination is made as to whether the job is complete (decision 550). If the job is not complete, decision 550 branches to "No" branch 552 whereupon processing loops back to process the next instruction. This looping continues until the job is complete, at which point decision 550 branches to "Yes" branch 558 whereupon processing returns at 560.

Figure 6:
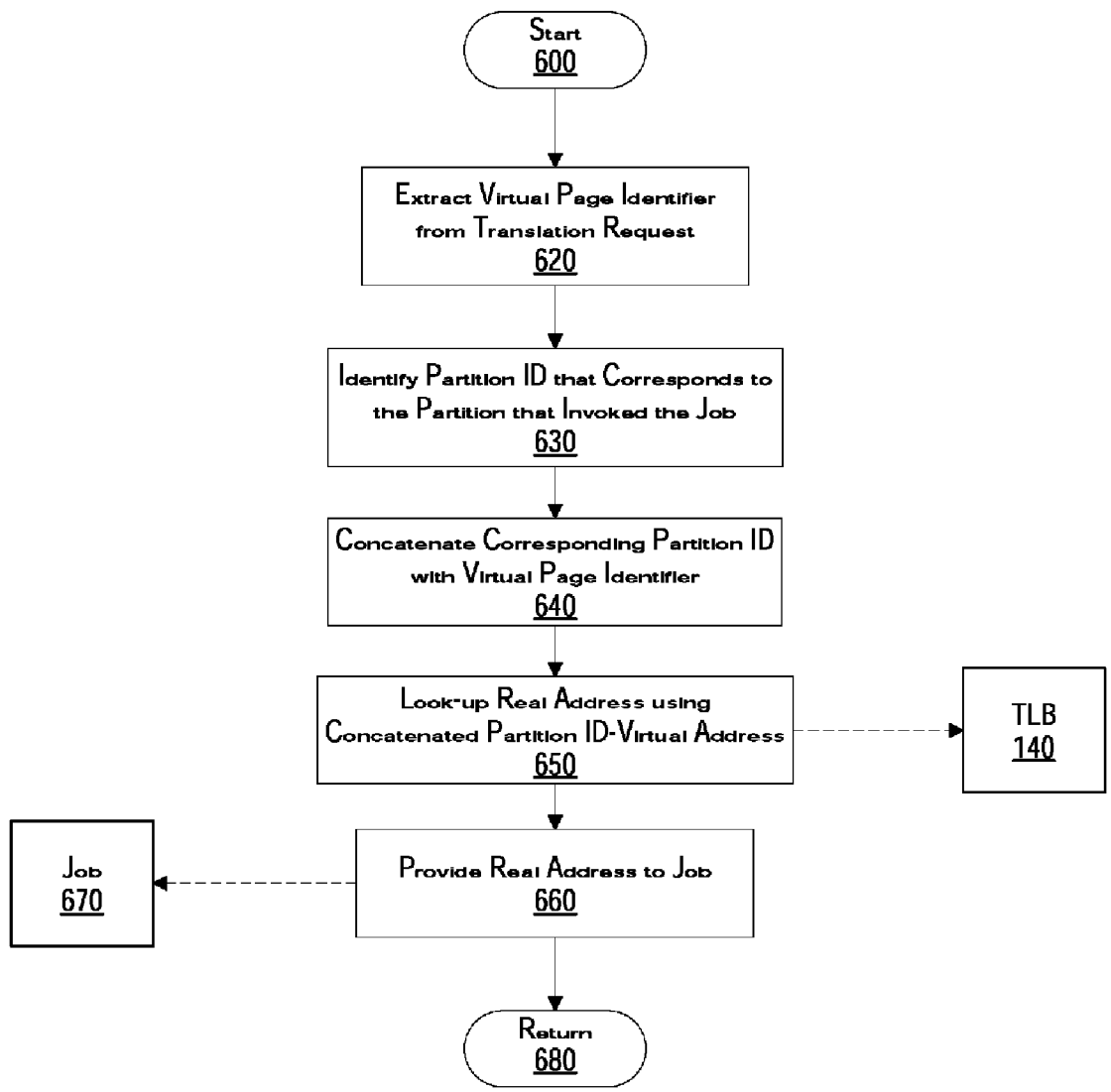
FIG. 6 is a flowchart showing steps taken in translating a virtual page identifier to a system-wide real address by concatenating the virtual page identifier with a partition identifier.

FIG. 6 is a flowchart showing steps taken in translating a virtual page identifier to a system-wide real address by concatenating the virtual page identifier with a partition identifier. Processing commences at 600, whereupon processing extracts the virtual page identifier from a translation request by that is received from a job that is currently executing (see FIG. 5 and corresponding text for further details). At step 630, processing identifies a partition identifier that corresponds to the partition that invoked the executing job. Next, processing concatenates the partition identifier with the virtual page identifier in order to generate a unique concatenated virtual address (step 640).

Using the concatenated virtual address, processing looks-up a system-wide real address in TLB 140 at step 650. Since processing uses concatenated virtual addresses, multiple jobs originating from different partitions may be simultaneously executed because each concatenated virtual address corresponds to a single system-wide real address (see FIG. 3 and corresponding text for further details). At step 660, processing provides the system-wide real address to job 670 and returns at 680.

Figure 7:
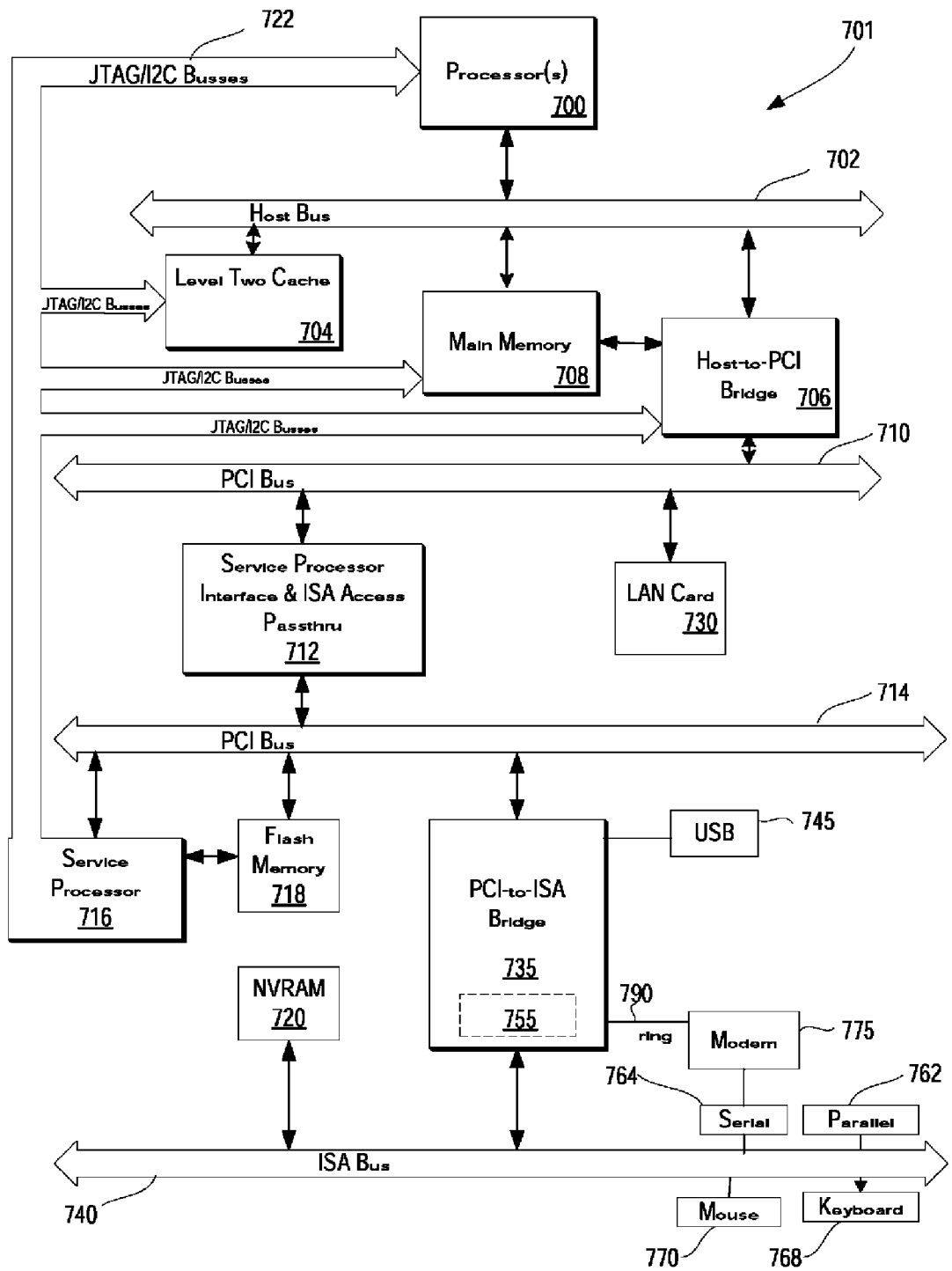
FIG. 7 is a block diagram of a computing device capable of implementing the present invention.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While FIG. 7 shows one information handling system that employs processor(s) 700, the information handling system may take many forms. For example, information handling system 701 may take the form of a desktop, server, portable, laptop, notebook, or other form factor computer or data processing system. Information handling system 701 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
loading a first job initiated by a first partition onto a first hardware thread, the first partition including a first subset of processor resources;
loading a second job initiated by a second partition onto a second hardware thread, the second partition including a second subset of processor resources;
translating a first concatenated virtual address into a first system-wide real address, wherein the first concatenated virtual address includes a first virtual page identifier and a first partition identifier, the first partition identifier identifying the first partition;
translating a second concatenated virtual address into a second system-wide real address, wherein the second concatenated virtual address includes a second virtual page identifier and a second partition identifier, the second partition identifier identifying the second partition; and
simultaneously executing the first job on the first hardware thread using the first system-wide real address and the second job on the second hardware thread using the second system-wide real address, wherein the first hardware thread and the second hardware thread are co-located on a processor.

2. The method of claim 1 wherein the first job and the second job share a single translation lookaside buffer located on the processor.

3. The method of claim 1 wherein the first system-wide real address is different from the second system-wide real address throughout a computer system that includes the processor.

4. The method of claim 1 wherein the first partition is invoked by the processor and the second partition is invoked by a different processor.

5. A computer program product stored on computer storage containing instructions for execution by a computer, which, when executed by the computer, cause the computer to implement a method of processing jobs, the method comprising:
loading a first job initiated by a first partition onto a first hardware thread, the first partition including a first subset of processor resources in a processor;
loading a second job initiated by a second partition onto a second hardware thread, the second partition including a second subset of processor resources in the processor;
translating a first concatenated virtual address into a first system-wide real address, wherein the first concatenated virtual address includes a first virtual page identifier and a first partition identifier, the first partition identifier identifying the first partition;
translating a second concatenated virtual address into a second system-wide real address, wherein the second concatenated virtual address includes a second virtual page identifier and a second partition identifier, the second partition identifier identifying the second partition; and
simultaneously executing the first job on the first hardware thread using the first system-wide real address and the second job on the second hardware thread using the second system-wide real address, wherein the first hardware thread and the second hardware thread are co-located on the processor.

6. The computer program product of claim 5 wherein the first job and the second job share a single translation lookaside buffer located on the processor.

7. The computer program product of claim 5 wherein the first system-wide real address is different from the second system-wide real address throughout a computer system that includes the processor.

8. The computer program product of claim 5 wherein the first partition is invoked by the processor and the second partition is invoked by a different processor.

9. An information handling system comprising:
one or more processors;
a memory accessible by the processors;
one or more nonvolatile storage devices accessible by the processors; and a set of instructions stored in the memory, wherein one or more of the processors executes the set of instructions in order to perform actions of:
loading a first job initiated by a first partition onto a first hardware thread, the first partition including a first subset of processor resources in a processor;
loading a second job initiated by a second partition onto a second hardware thread, the second partition including a second subset of processor resources in the processor;
translating a first concatenated virtual address into a first system-wide real address, wherein the first concatenated virtual address includes a first virtual page identifier and a first partition identifier, the first partition identifier identifying the first partition;
translating a second concatenated virtual address into a second system-wide real address, wherein the second concatenated virtual address includes a second virtual page identifier and a second partition identifier, the second partition identifier identifying the second partition; and
simultaneously executing the first job on the first hardware thread using the first system-wide real address and the second job on the second hardware thread using the second system-wide real address, wherein the first hardware thread and the second hardware thread are co-located on the processor.

10. The information handling system of claim 9 wherein the first job and the second job share a single translation lookaside buffer located on the processor.

11. The information handling system of claim 9 wherein the first system-wide real address is different from the second system-wide real address throughout a computer system that includes the processor.

* * * * *